US012688091B2

(12) United States Patent
Sethi et al.

(10) Patent No.: US 12,688,091 B2
(45) Date of Patent: Jul. 21, 2026

(54) FAILURE PREDICTION AND LOAD BALANCING FOR CHASSIS COMPONENTS

(71) Applicant: Dell Products L.P., Round Rock, TX (US)

(72) Inventors: Parminder Singh Sethi, Ludhiana (IN); Raahul Kumar, Bangalore (IN); Veena Ramarao, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 24 days.

(21) Appl. No.: 18/800,403

(22) Filed: Aug. 12, 2024

(65) Prior Publication Data

US 2026/0044415 A1     Feb. 12, 2026

(51) Int. Cl.
*G06F 11/00*        (2006.01)
*G06F 11/07*        (2006.01)
*G06F 11/14*        (2006.01)

(52) U.S. Cl.
CPC ...... *G06F 11/1423* (2013.01); *G06F 11/0772* (2013.01)

(58) Field of Classification Search
CPC ........................ G06F 11/1423; G06F 11/0772
See application file for complete search history.

(56) References Cited

U.S. PATENT DOCUMENTS 7,206,953 B1 *  4/2007  Wilson ................ G06F 11/3072
                                                    713/323
7,752,493 B2 *  7/2010  Shin ..................... G06F 11/1662
                                                    714/12
2006/0015773 A1 *  1/2006  Singh .................. G06F 11/2046
                                                    714/13
2012/0158890 A1 *  6/2012  Jreij .................... G06F 11/3058
                                                    713/1
2020/0145509 A1 *  5/2020  Slik ......................... H04L 67/63

OTHER PUBLICATIONS

Dell Technologies, "Dell Chassis Management Controller Version 6.0 for PowerEdge M1000e User's Guide," https://www.dell.com/support/manuals/en-us/dell-chassis-management-controller-v6.0-poweredge-m1000e/cmcm1000e60ug/overview?guid=guid-e5398b0e-b346-4f97-9af1-247f54c5c3b2&lang=en-us#:~:text=The, Jul. 29, 2024, 2 pages.

(Continued)

*Primary Examiner* — Jason B Bryan
(74) *Attorney, Agent, or Firm* — Ryan, Mason & Lewis, LLP

(57) ABSTRACT

A method comprises establishing a communications channel between a host device operating system and a chassis management module of a chassis, analyzing, by the chassis management module, operational data corresponding to one or more chassis components and data corresponding to usage of one or more nodes by the host device operating system, and activating one or more of a plurality of flags based at least in part on the analyzing, wherein the plurality of flags respectively correspond to different failure events associated with at least one of the one or more chassis components and the one or more nodes. The one or more flags are sent from the chassis management module to the host device operating system via the communications channel.

20 Claims, 12 Drawing Sheets

1000

1002 — ESTABLISH A COMMUNICATIONS CHANNEL BETWEEN A HOST DEVICE OPERATING SYSTEM AND A CHASSIS MANAGEMENT MODULE OF A CHASSIS

1004 — ANALYZE, BY THE CHASSIS MANAGEMENT MODULE, OPERATIONAL DATA CORRESPONDING TO ONE OR MORE CHASSIS COMPONENTS AND DATA CORRESPONDING TO USAGE OF ONE OR MORE NODES BY THE HOST DEVICE OPERATING SYSTEM

1006 — ACTIVATE ONE OR MORE OF A PLURALITY OF FLAGS BASED AT LEAST IN PART ON THE ANALYZING, WHEREIN THE PLURALITY OF FLAGS RESPECTIVELY CORRESPOND TO DIFFERENT FAILURE EVENTS ASSOCIATED WITH AT LEAST ONE OF THE ONE OR MORE CHASSIS COMPONENTS AND THE ONE OR MORE NODES

1008 — SEND THE ONE OR MORE FLAGS FROM THE CHASSIS MANAGEMENT MODULE TO THE HOST DEVICE OPERATING SYSTEM VIA THE COMMUNICATIONS CHANNEL

(56)        References Cited

OTHER PUBLICATIONS

R. Awati, "Baseboard Management Controller (BMC)," https://www.techtarget.com/searchnetworking/definition/baseboard-management-controller#:~:text=A, Accessed Feb. 9, 2023, 3 pages.

Wikipedia, "Embedded Controller," https://en.wikipedia.org/w/index.php?title=Embedded_controller&oldid=1216544083, Mar. 31, 2024, 3 pages.

Wikipedia, "ZeroMQ," https://en.wikipedia.org/w/index.php?title=ZeroMQ&oldid=1213175843, Mar. 11, 2024, 4 pages.

Dell EMC, "Dell Chassis Management Controller Version 6.0 for PowerEdge M1000e," User's Guide, Sep. 2017, 248 pages.

U.S. Appl. No. 18/634,572 filed in the name of Parminder Singh Sethi et al. on Apr. 12, 2024, and entitled "Time Synchronization Between Chassis Components."

* cited by examiner

502

501

600

Fan Status

| Status | Name | Type | Current Speed | |
|---|---|---|---|---|
| | | | PWM (% of Max) | RPM |
| ▓ | System Board Fan1A | Standard | 44% | 10560 |
| ▓ | System Board Fan1B | Standard | 44% | 9480 |
| ▓ | System Board Fan2A | Standard | 44% | 10560 |
| ▓ | System Board Fan2B | Standard | 44% | 9240 |
| ▓ | System Board Fan3A | Standard | 44% | 10440 |
| ▓ | System Board Fan3B | Standard | 44% | 9480 |
| ▓ | System Board Fan4A | Standard | 44% | 10560 |
| ▓ | System Board Fan4B | Standard | 44% | 9480 |
| ▓ | System Board Fan5A | Standard | 44% | 10440 |
| ▓ | System Board Fan5B | Standard | 44% | 9360 |
| ▓ | System Board Fan6A | Standard | 44% | 10440 |
| ▓ | System Board Fan6B | Standard | 44% | 9360 |

Temperature Probes

| Status | Probe Name | Reading | Warning Threshold | | Critical Threshold | |
|---|---|---|---|---|---|---|
| | | | Min | Max | Min | Max |
| ▦ | CPU1 Temp | 40 °C (104 °F) | N/A | N/A | 3 °C (37.4 °F) | 98 °C (208 °F) |
| ▦ | CPU2 Temp | 38 °C (100.4 °F) | N/A | N/A | 3 °C (37.4 °F) | 95 °C (203 °F) |
| ▦ | System Board Inlet Temp | 28 °C (88 °F) | 3 °C (37.4 °F) Edit | 38 °C (100.4 °F) Edit | -7 °C (19.4 °F) | 42 °C (107.6 °F) |
| ▦ | System Board GPU1 Temp | 60 °C (140 °F) | N/A | N/A | N/A | N/A |
| ▦ | System Board GPU2 Temp | 58 °C (136.4 °F) | N/A | N/A | N/A | N/A |

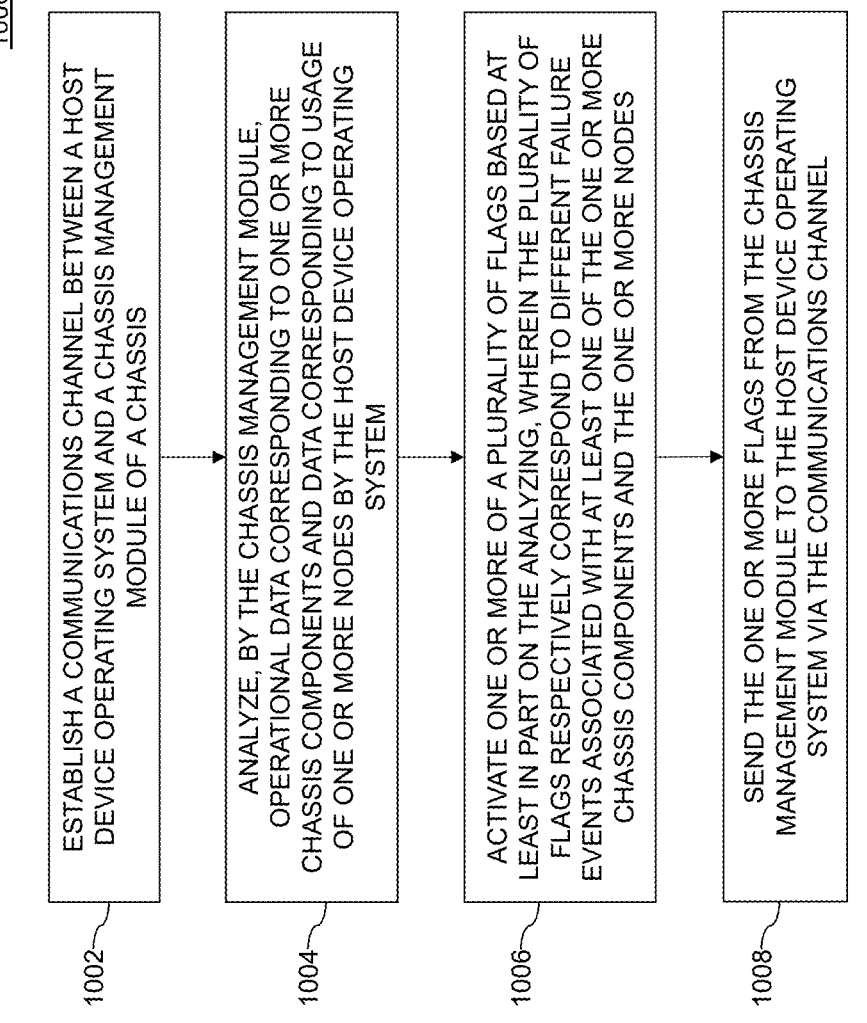

1000

1002 — ESTABLISH A COMMUNICATIONS CHANNEL BETWEEN A HOST DEVICE OPERATING SYSTEM AND A CHASSIS MANAGEMENT MODULE OF A CHASSIS

1004 — ANALYZE, BY THE CHASSIS MANAGEMENT MODULE, OPERATIONAL DATA CORRESPONDING TO ONE OR MORE CHASSIS COMPONENTS AND DATA CORRESPONDING TO USAGE OF ONE OR MORE NODES BY THE HOST DEVICE OPERATING SYSTEM

1006 — ACTIVATE ONE OR MORE OF A PLURALITY OF FLAGS BASED AT LEAST IN PART ON THE ANALYZING, WHEREIN THE PLURALITY OF FLAGS RESPECTIVELY CORRESPOND TO DIFFERENT FAILURE EVENTS ASSOCIATED WITH AT LEAST ONE OF THE ONE OR MORE CHASSIS COMPONENTS AND THE ONE OR MORE NODES

1008 — SEND THE ONE OR MORE FLAGS FROM THE CHASSIS MANAGEMENT MODULE TO THE HOST DEVICE OPERATING SYSTEM VIA THE COMMUNICATIONS CHANNEL

FIG. 10

FAILURE PREDICTION AND LOAD BALANCING FOR CHASSIS COMPONENTS

FIELD

The field relates generally to information processing systems, and more particularly to chassis component management in such information processing systems.

BACKGROUND

Current failure analysis for a chassis by host device resources is limited to analyzing health and real-time data of a portion of the hardware and components of the chassis. As a result, there are inaccuracies and delays when attempting to identify failure issues and/or events. With conventional approaches, since operating systems are provided with limited data and lack data from certain components, component operational issues may go undetected, and failures may occur. In addition, during a failure in an existing cluster, a load may be migrated to one or more components that already have issues which were not detected. Current techniques also limit failure detection to certain resources with high loads, while other resources with lower loads are not used to perform failure analysis.

SUMMARY

Illustrative embodiments provide a platform and techniques to provide failure prediction and load balancing for chassis components.

For example, in one embodiment, a method comprises establishing a communications channel between a host device operating system and a chassis management module of a chassis, analyzing, by the chassis management module, operational data corresponding to one or more chassis components and data corresponding to usage of one or more nodes by the host device operating system, and activating one or more of a plurality of flags based at least in part on the analyzing, wherein the plurality of flags respectively correspond to different failure events associated with at least one of the one or more chassis components and the one or more nodes. The one or more flags are sent from the chassis management module to the host device operating system via the communications channel.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

These and other features and advantages of embodiments described herein will become more apparent from the accompanying drawings and the following detailed description.

BRIEF DESCRIPTION OF THE DRAWINGS

FIG. 6 depicts a screenshot of a user interface illustrating fan status for different fans of a system, according to an illustrative embodiment.

FIG. 7 depicts a screenshot of a user interface illustrating temperature values and thresholds for different hardware components of a system, according to an illustrative embodiment.

FIG. 8 depicts a screenshot of a user interface illustrating a log of operation of a central processing unit (CPU) where a CPU error was detected, according to an illustrative embodiment.

FIG. 9 depicts a screenshot of a user interface illustrating a log of operation of a memory device where a diagnostic warning was issued and an issue with the memory device was detected, according to an illustrative embodiment.

FIG. 10 depicts a process for implementing failure prediction and load balancing for chassis components, according to an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment is implemented, other appropriate timescales that provide at least contemporaneous performance and output can be achieved.

Figure 1:
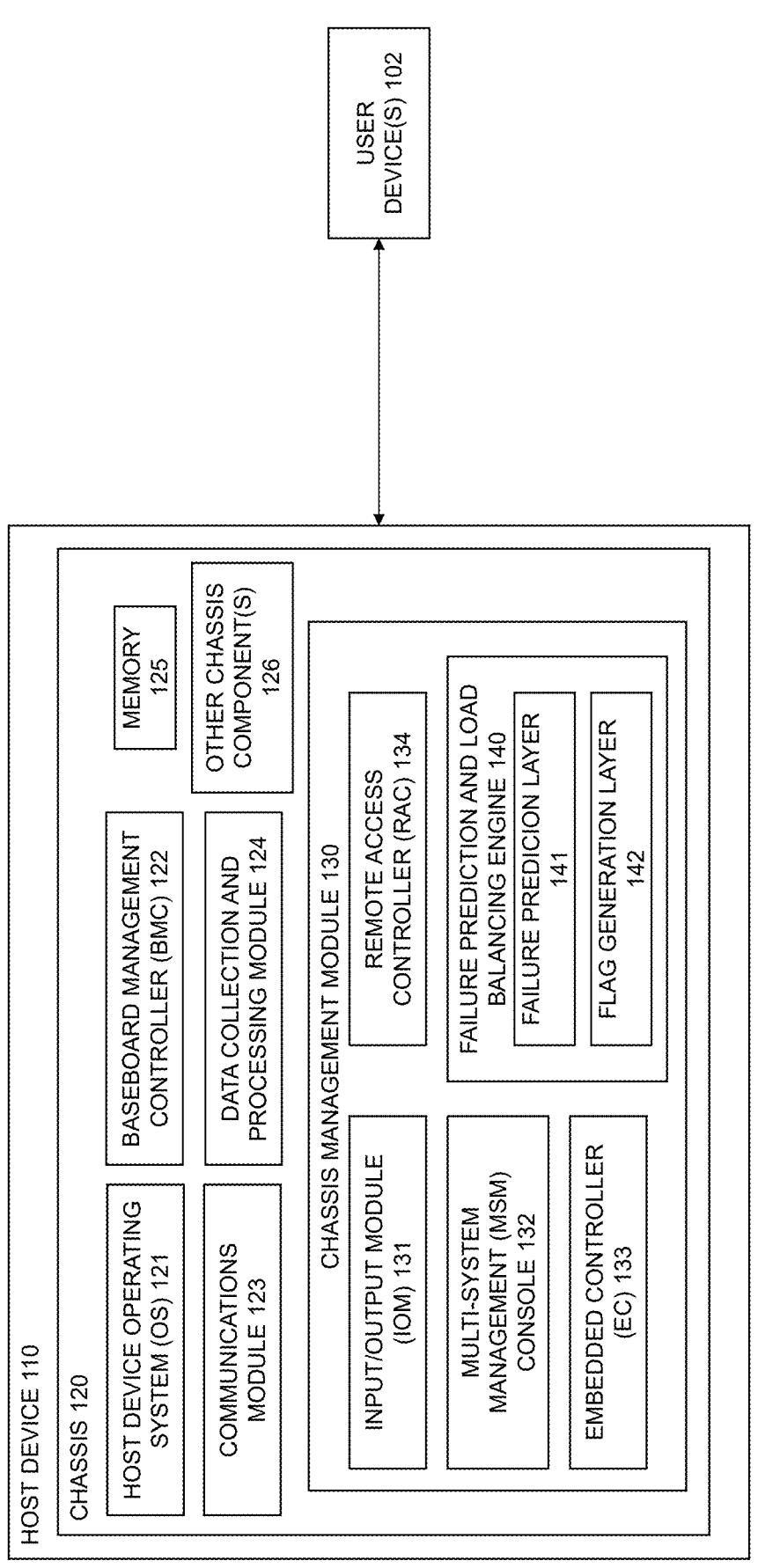
FIG. 1 depicts an information processing system comprising a platform for implementing failure prediction and load balancing for chassis components, according to an illustrative embodiment.

FIG. 1 depicts an information processing system 100 comprising a host device 110 including a chassis 120 comprising chassis components such as, for example, a host device operating system (OS) 121, a baseboard management controller (BMC) 122, a communications module 123, a data collection and processing module 124, a memory 125 and one or more other chassis components 126 (e.g., expansion cards, disk drives, power supply units, central processing units, graphics processing units, memories, etc.). The chassis further includes a chassis management module 130. The chassis management module 130 includes an input/output module (IOM) 131, a management service module (MSM) console 132, an embedded controller (EC) 133, a remote access controller (RAC) 134 and a failure prediction and load balancing engine 140. The failure prediction and load balancing engine 140 includes a failure prediction layer 141 and a flag generation layer 142.

As noted herein above, current failure analysis for a chassis by host device resources (e.g., host device OS 121) is limited to analyzing health and real-time data of a portion of the hardware and components of the chassis, causing inaccuracies and delays when attempting to identify failure issues and/or events. As a result, component operational issues may go undetected, and failures may occur. Further, loads may be migrated to components with the undetected operational issues.

In an attempt to address the above technical problems, the illustrative embodiments advantageously provide a platform for implementing failure prediction and load balancing for chassis components. The platform includes the failure prediction and load balancing engine 140, which is part of the chassis management module 130. The failure prediction and load balancing engine 140 is configured to perform hardware level failure prediction and host device load balancing analysis at the chassis hardware level. The failure prediction and load balancing engine 140 offloads predictive failure and load-balancing operations from host device OS 121 to the chassis management module 130. As an additional advantage, in illustrative embodiments, the communications module 123 establishes end-to-end communication between a modular chassis manager (e.g., chassis management module 130), a server BMC (e.g., BMC 122), and an OS application (e.g., host device OS 121).

The host device OS 121 comprises, for example, Windows®, Linux®, VMWare®, RedHat® or other type of operating system. The host device 110 further includes a basic input/output system (BIOS) (not shown). In a non-limiting illustrative example, the BIOS can be in the form of firmware and/or software which includes a program that starts a computer system after it is powered on, and manages data flow between a computer's operating system (e.g., host device OS 121) and attached devices, such as, for example, a hard disk, video adapter, keyboard, mouse, printer, etc. The BIOS can be embedded on a memory chip on a system board or motherboard of the host device 110, and function as an interface between hardware of the host device 110 and the host device OS 121.

In illustrative embodiments, the BMC 122 is a system on check (SoC) device, which provides individualized access to enterprise servers. The BMC 122 enables performance of actions such as, for example, deployment management, inventory management, power management, thermal management, etc. The BMC 122 comprises a specialized processor that monitors the physical state of the host device 110 or other hardware. The BMC 122 may use one or more sensors (not shown) to measure parameters such as, for example, temperature, humidity, power-supply voltage, fan speeds, communications parameters and functions of the host device OS 121, and other operating systems associated with the host device 110. The BMC 122 can be part of an intelligent platform management interface (IPMI) and may be a component of the motherboard or main circuit board of the host device 110.

A non-limiting example of a BMC 122 is a remote access controller (RAC) such as, for example, an integrated Dell® RAC (iDRAC). An iDRAC allows information technology (IT) administrators to monitor, manage, update, troubleshoot, and remediate the host device 110 (e.g., server) out-of-band from any location without the use of agents. The BMC 122 includes hardware and software that provide a variety of features including, but not necessarily limited to, device management, monitoring, power cycling, authentication, data collection and data analytics.

In illustrative embodiments, using the end-to-end communication channel(s) established by the communications module 123, the data collection and processing module 124 collects operational data for hardware components and usage data for different nodes of the chassis (e.g., servers) from the host device OS 121, BMC 122 and the chassis management module 130 so that a complete failure prediction and load balancing analysis of chassis operations and components can be performed by the failure prediction and load balancing engine 140. In illustrative embodiments, the data collected by the data collection and processing module 124 is stored in the memory 125, and can be accessed by the failure prediction and load balancing engine 140. The memory 125 includes, for example, a BIOS non-volatile random-access memory (NVRAM) or other persistent storage of the BIOS.

The chassis management module 130 is configured to maintain system health, manage system power and control temperature. For example, the chassis management module 130 manages fan units and power supplies. The chassis management module 130 manages field replaceable units (FRUs), boards, sensors and other hardware, and is configured to provide logs of sensor events, including temperature and voltage fluctuations. The chassis management module 130 identifies, for example, failed or failing sensors, fans and voltage conditions.

The chassis management module 130 includes an IOM 131. The IOM 131 provides for communication between servers and peripheral devices. In illustrative embodiments, the IOM 131 can be used to report status of chassis components, manage information flow between a computer system and an external device, perform decoding and command acceptance, detect errors and perform data buffering. The IOM 131 may also provide interface connections to blade servers in a chassis.

The MSM console 132 is a web-based chassis management console that utilizes a user interface (UI) which provides access for a user to perform chassis-related deployment, configuring, management and monitoring tasks. For example, blade server deployment and configuration deployments can be controlled via the MSM UI. The MSM UI provides access for a user to configure multiple installed components in a chassis. The EC 133 is a chassis component responsible for performing tasks such as, for example, bare metal deployment, monitoring, logging, inventory management, power management, thermal management, fan profiling, etc. In illustrative embodiments, the EC 133 may have its own operating system, which works in command-line interface (CLI) mode and provides required data and access to the MSM console 132 and MSM UI. Access to the EC 133 can be limited to developers and support team members for debugging; however, some of these actions may be performed using the MSM UI. The chassis management module includes an RAC 134, which can be, for example, an iDRAC.

The host device 110 is connected to one or more networks to communicate with external devices such as, for example, one or more user devices 102, which may be used by, for example, administrators or customers of an enterprise. The networks comprise at least a portion of a global computer network such as the Internet, although other types of networks can be part of the networks, including a wide area network (WAN), a local area network (LAN), a satellite network, a telephone or cable network, a cellular network, a wireless network such as a WiFi or WiMAX network, or various portions or combinations of these and other types of networks. The networks comprise combinations of multiple different types of networks each comprising processing devices configured to communicate using Internet Protocol (IP) or other related communication protocols.

In a non-limiting illustrative example, some embodiments may utilize one or more high-speed local networks in which associated processing devices communicate with one another utilizing PCIe cards of those devices, and networking protocols such as InfiniBand, Gigabit Ethernet or Fibre Channel. Numerous alternative networking arrangements are possible in a given embodiment, as will be appreciated by those skilled in the art.

The host device 110 illustratively comprises a computer, server or other type of processing device. At least a portion of the host device 110 can be implemented with virtual machines (VMs), containers, etc. The host device 110 and/or components thereof can comprise, for example, a desktop, laptop or tablet computer, server, storage device or other type of processing device. Such a device is an example of what is more generally referred to herein as a "processing device." Some of the processing devices are also generally referred to herein as "computers." The host device 110 in some embodiments comprises a computer associated with a particular company, organization or other enterprise.

The terms "user," "customer," "client" or "administrator" herein are intended to be broadly construed so as to encompass numerous arrangements of human, hardware, software or firmware entities, as well as combinations of such entities. At least a portion of the available services and functionalities provided by the host device 110 and/or components thereof in some embodiments may be provided under Function-as-a-Service ("FaaS"), Containers-as-a-Service ("CaaS") and/or Platform-as-a-Service ("PaaS") models, including cloud-based FaaS, CaaS and PaaS environments. Although not explicitly shown in FIG. 1, one or more input-output devices such as keyboards, displays or other types of input-output devices may be used to support one or more user interfaces to the host device 110. The term "user" herein is intended to be broadly construed so as to encompass numerous arrangements of human, hardware, software or firmware entities, as well as combinations of such entities.

Figure 2:
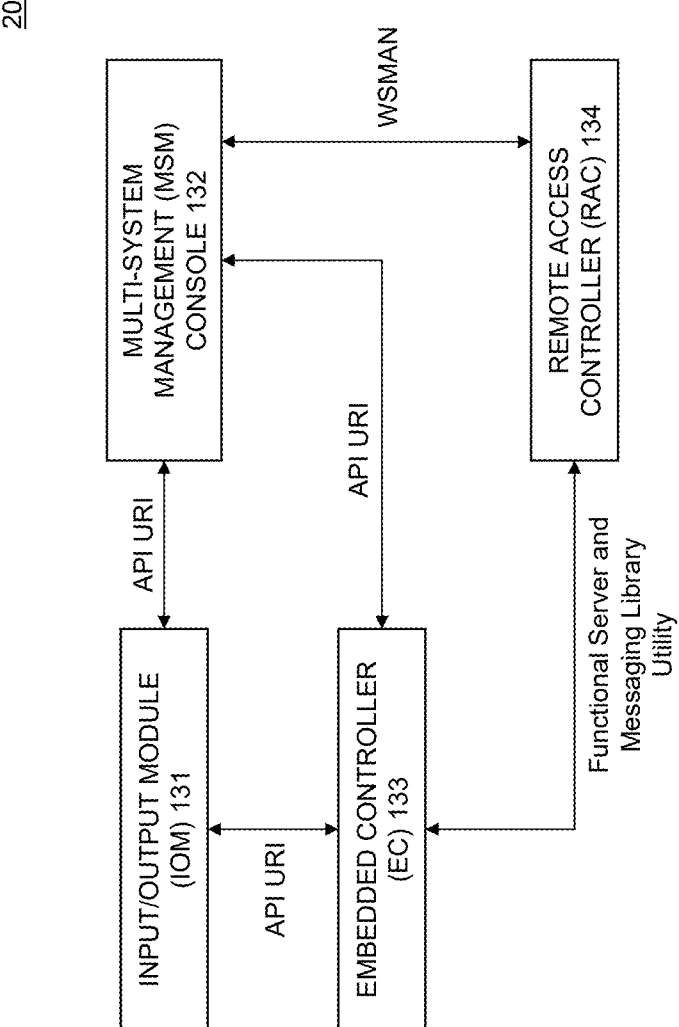
FIG. 2 depicts an operational flow for communication between chassis manager components, according to an illustrative embodiment.

Referring, for example, to the operational flow 200 in FIG. 2, a communication channel between the IOM 131 and the MSM console 132 and a communication channel between the MSM console 132 and the EC 133 uses, for example, an API uniform resource identifier (URI), such as a Redfish® URI and one or more internal commands. For example, a remote access controller command-line utility may be used for initial configuration setup and troubleshooting between the MSM console 132 and the EC 133. An example of the remote access controller command-line utility is the RACADM command-line utility, which provides a scriptable interface that allows for component configuration. The utility can run on the MSM console 132. In illustrative embodiments, the URI includes a character sequence that identifies logical and/or physical resources to distinguish one resource from another. A communication channel between the MSM console 132 and the RAC 134 uses, for example, a command and/or a web services-management (WSMAN) protocol. A communication channel is established between the EC 133 and RAC 134 using, for example, a functional server and messaging library utility. A functional server utility can be a program to validate transactions and update databases. In illustrative embodiments, the functional server utility records and updates error flags and returns error messages in connection with calls to a server. In illustrative embodiments, the messaging library utility provides a message queue, and can run without a dedicated message broker. A messaging library API provides sockets, each socket representing a many-to-many connection between endpoints. A non-limiting example of a messaging library is the ZeroMQ messaging library.

Figure 3:
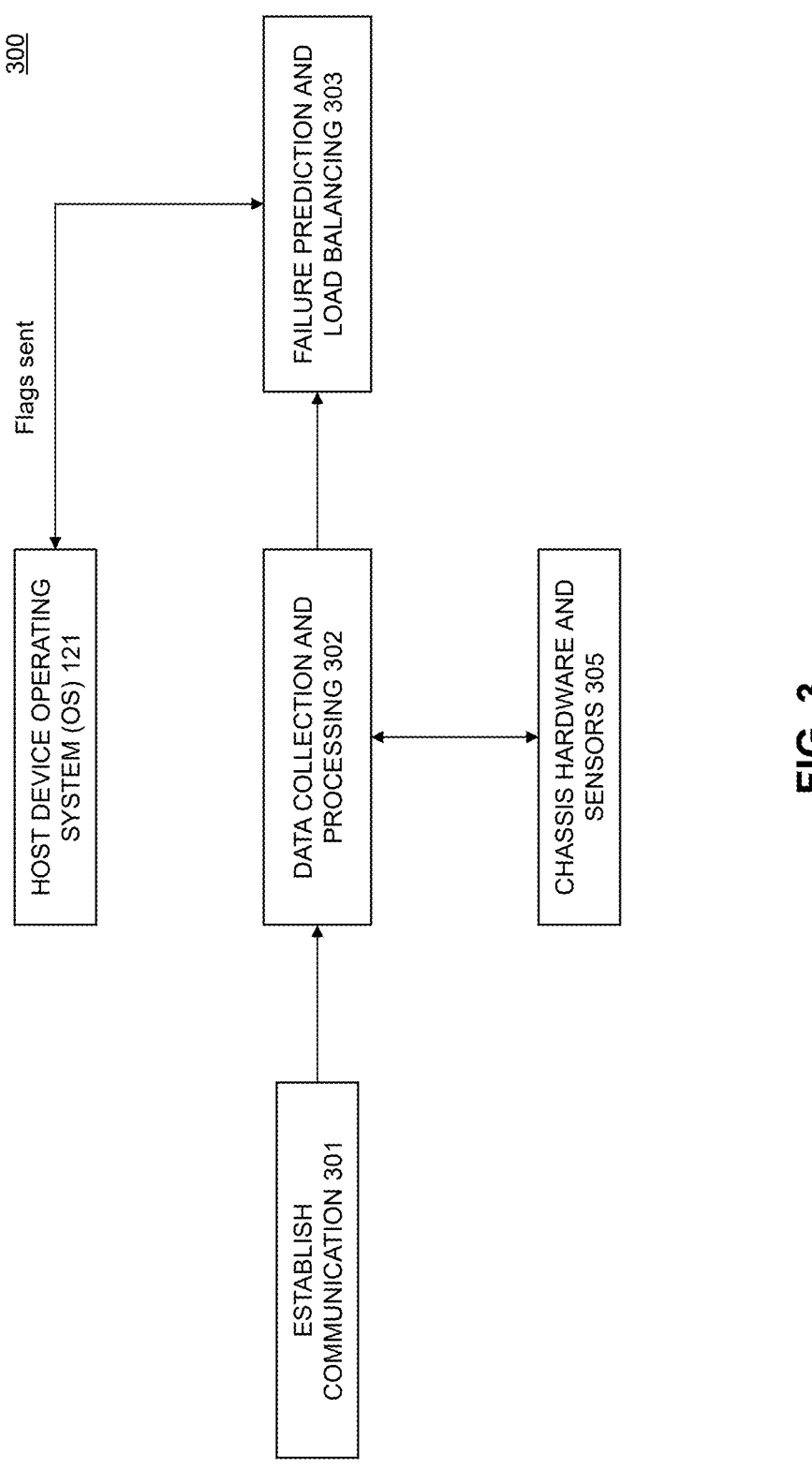
FIG. 3 depicts an operational flow for establishing communication, collecting data and performing failure prediction, according to an illustrative embodiment.

Referring to the operational flow 300 in FIG. 3, at block 301, the communications module 123 establishes end-to-end communication between the chassis management module 130, BMC 122 and host device OS 121 using, for example, one or more software-based management modules such as an integration plugin to establish communication between the BMC 122 and host device OS 121. A non-limiting example of the integration plug-in is the Dell® vLCM (vSphere Lifecycle Manager). In addition to software-based management modules, a universal serial bus network interface controller operating system (USB-NIC OS) passthrough communication channel is used for communication between the BMC 122 and host device OS 121 to share logs and alerts. OpenManage Enterprise Modular (OME-M) is a private virtual LAN (VLAN) network used for communication between the chassis management module 130 and the BMC 122.

Figure 4:
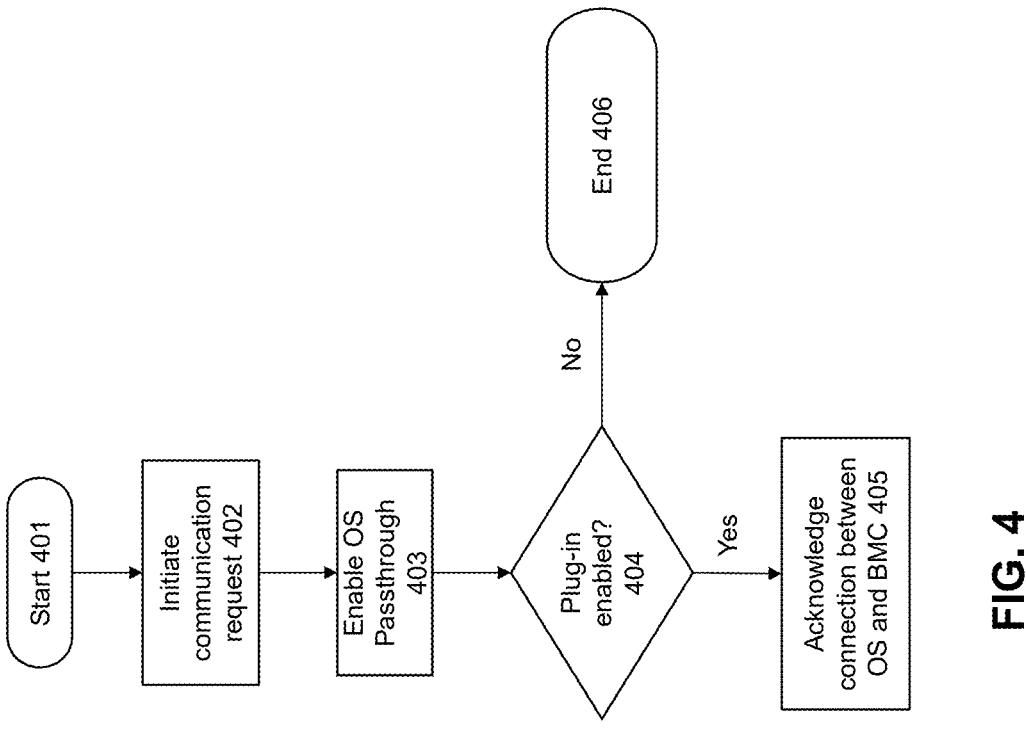
FIG. 4 depicts a process flow for establishing communication channels, according to an illustrative embodiment.

In more detail, in FIG. 4, a process flow for establishing communication channels between a host device OS 121 and BMC 122 is shown. Referring to steps 401 and 402, the process flow is started by initiating a communication request. Then at step 403, an OS passthrough communication channel is enabled. Then, at step 404, a query is made whether a plug-in such as, for example, vLCM or OpenManage Integration for VMware vCenter (OMIVV) is enabled. If the plug-in is enabled, the process flow proceeds to step 405, where a connection between the host device OS 121 and the BMC 122 is acknowledged. Then the process flow 400 ends at step 406. If the plug-in is not enabled, the process ends at step 406.

Referring back to FIG. 3, following the establishment of end-to-end communication, at block 302, the data collection and processing module 124 uses the established end-to-end communication channel to collect operational data and data corresponding usage of the one or more nodes. The collected data can be stored in the memory 125 or other internal persistent memory of the chassis 120. The saved data is processed (e.g., duplicate data is removed, data is compressed, some data is deleted, etc.). For example, the stored data in memory 125 is scrubbed for redundant and/or duplicate data. Some of the operational data that is stored includes, for example, hardware sensor data, health/event logs from the chassis management module 130 and BMC 122, data corresponding to host device OS 121 and application usage on one or more nodes (e.g., servers, virtual machines (VMs), containers, hypervisors, etc.) and resource usage logs for each node (e.g., CPU utilization, memory (e.g., RAM) utilization, disk (e.g., hard disk drive) utilization and storage utilization (e.g., capacity).

Figures 5A, 5B:
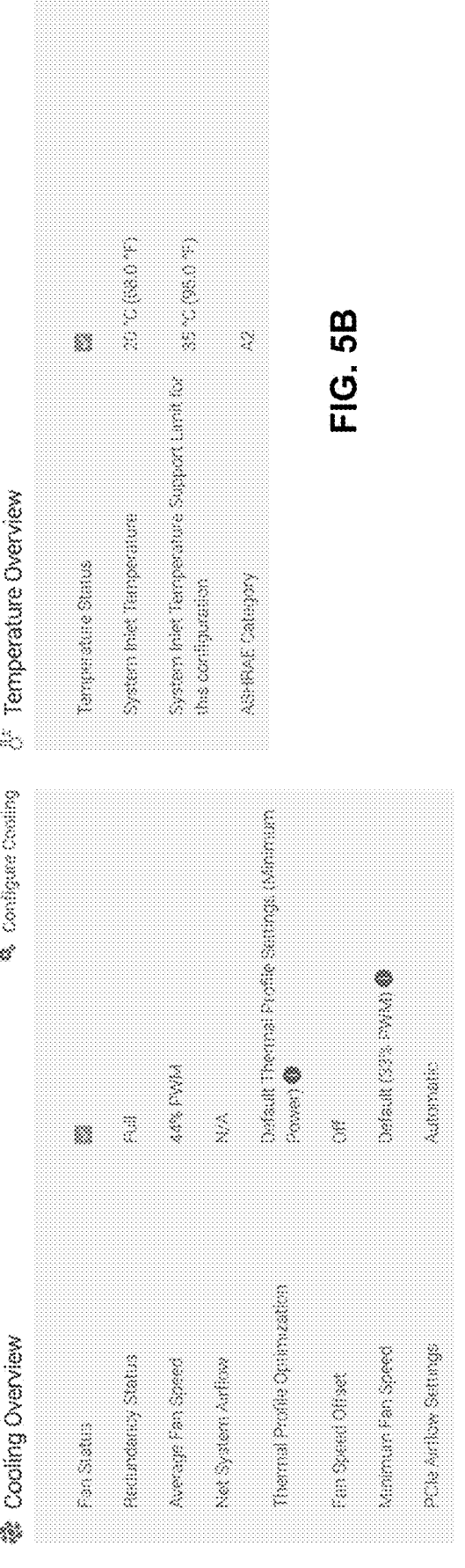
FIG. 5A depicts a screenshot of a user interface illustrating cooling system metrics, according to an illustrative embodiment.
FIG. 5B depicts a screenshot of a user interface illustrating temperature metrics for a system, according to an illustrative embodiment.

In an example of collected operational data, FIG. 5A illustrates a screenshot 501 of a user interface illustrating cooling system metrics including, for example, fan speed, thermal profile optimization and airflow settings. FIG. 5B depicts a screenshot 502 of a user interface illustrating temperature metrics for a system including, for example, system inlet temperature and system inlet temperature support limit. With conventional approaches, if a host device OS 121 were performing failure analysis, the host device OS 121 (e.g., hypervisor) would be unaware of this operational data.

In another example of collected operational data, FIG. 6 depicts a screenshot 600 of a user interface illustrating fan status for different fans of a system (e.g., system board fan 1A, 1B, 2A, 2B, 3A, 3B, etc.). The data includes speed as a percentage of a maximum speed and RPM. There may be instances where although a CPU is under used, the fans will be running at 100% capacity due to multiple reasons like faulty fans, inlet temperature etc. With conventional approaches, if a host device OS 121 were performing failure analysis, the host device OS 121 (e.g., hypervisor) would be unaware of this operational data.

In another example of collected operational data, FIG. 7 depicts a screenshot 700 of a user interface illustrating temperature values and thresholds for different hardware components of a system. The data includes CPU, system board inlet and system board GPU temperatures from temperature probes, warning minimum and maximum temperature thresholds and critical minimum and maximum temperature thresholds. There may be multiple instances where, although a CPU is under-utilized, the CPU temperature can reach a maximum due to issues with internal and/or external cooling units. With conventional approaches, if a host device OS 121 were performing failure analysis, the host device OS 121 (e.g., hypervisor) would be unaware of this operational data.

Figure 8:
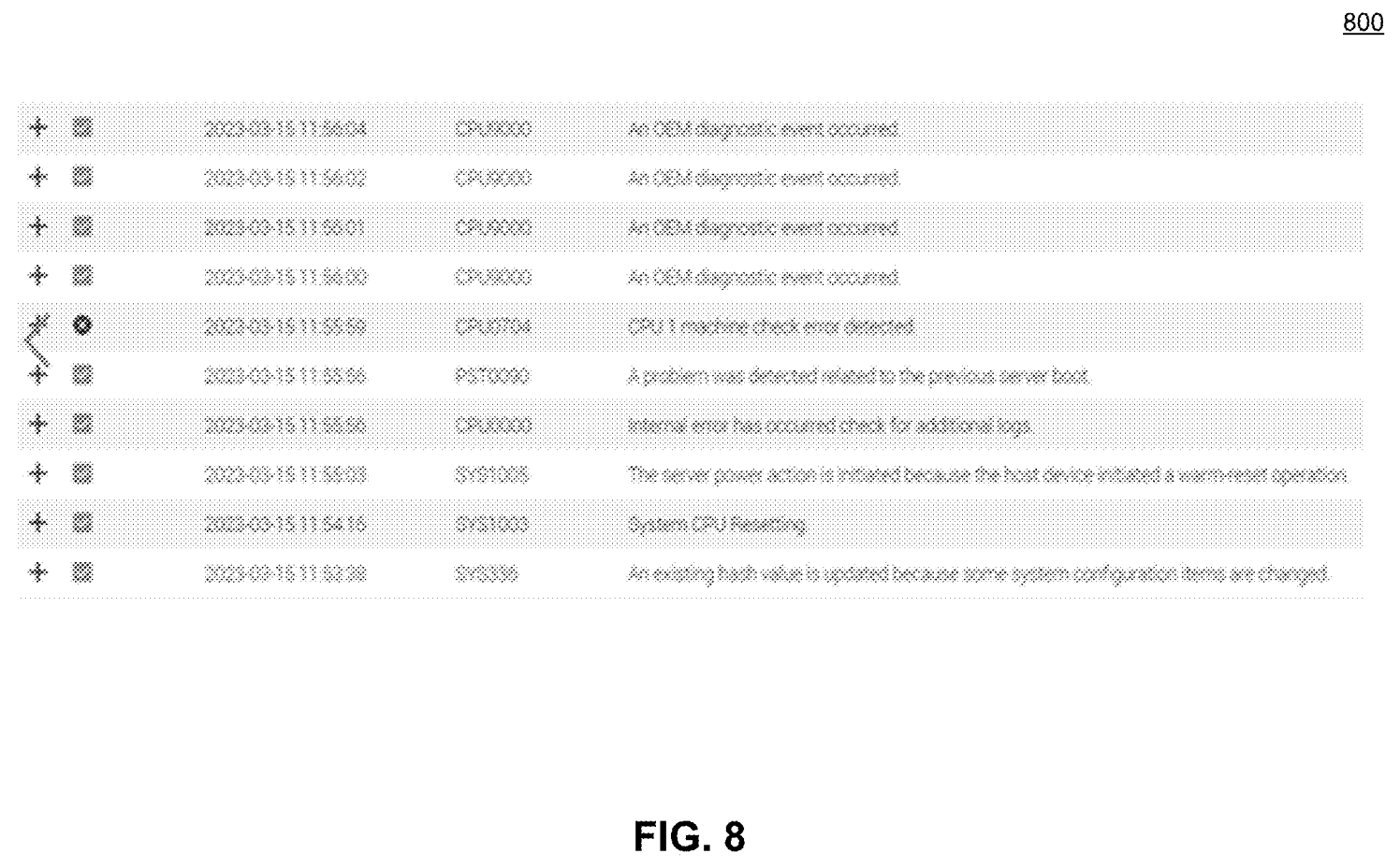

In another example of collected operational data, FIG. 8 depicts a screenshot 800 of a user interface illustrating a log of the operation of a CPU where a CPU error was detected. The screenshot 800 shows logged messages from Lifecycle Controller logs in an iDRAC (e.g., BMC 122). The error is critical, and the CPU can fail. With conventional approaches, if a host device OS 121 were performing failure analysis, the host device OS 121 (e.g., hypervisor) would be unaware of this operational data.

Figure 9:
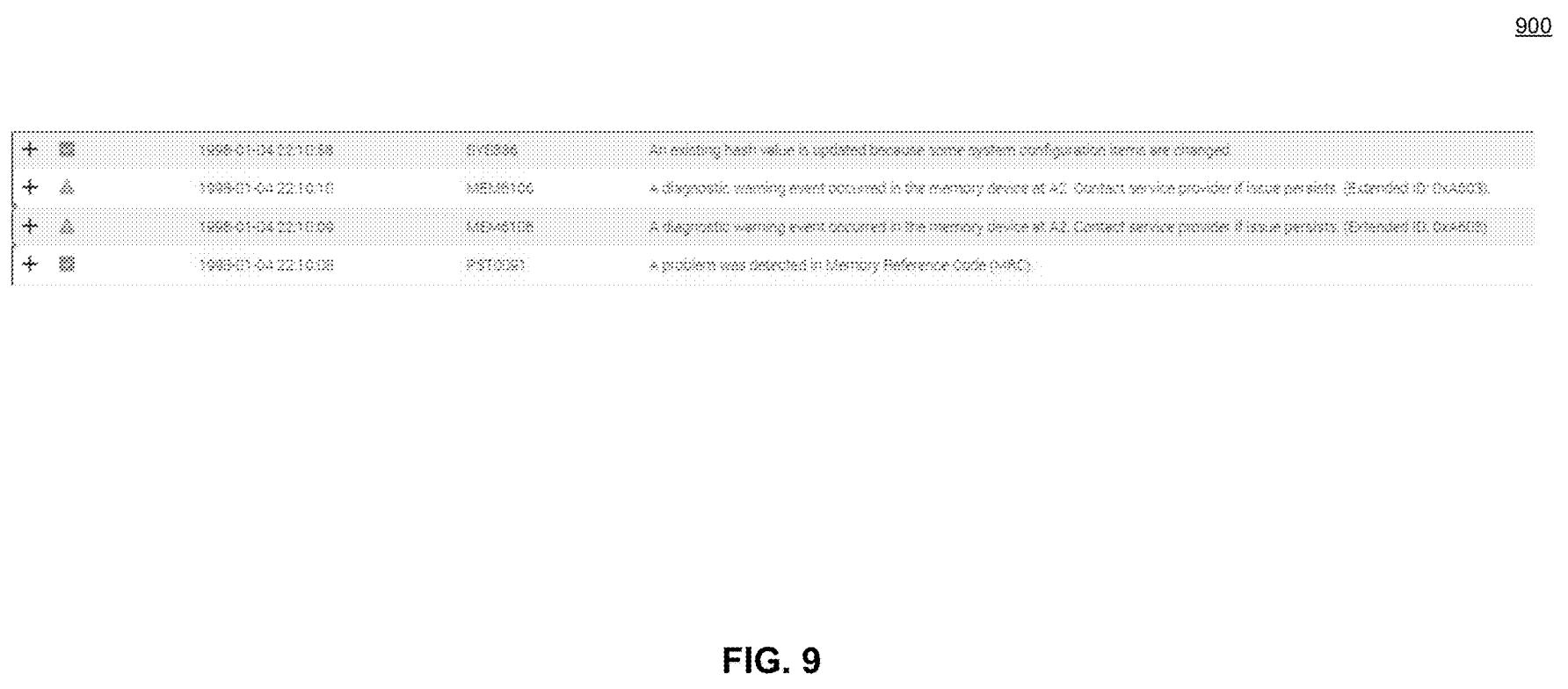

In another example of collected operational data, FIG. 9 depicts a screenshot 900 of a user interface illustrating a log of operation of a memory device, where a diagnostic warning was issued and an issue with the memory device was detected. The screenshot 900 shows information about a diagnostic warning on a memory device in the A2 slot. However, the health status of the dual in-line memory module (DIMM) at A2 will remain as healthy since this is a warning event.

Referring back to FIG. 3, the collected and processed data from, for example, chassis hardware and sensors (block 305), is provided to the failure prediction and load balancing engine 140 (block 303) so that the failure prediction layer 141 can analyze the operational data and data corresponding to node usage to identify one more failure scenarios (events), and the flag generation layer 142 can activate one or more of a plurality of flags based at least in part on the analyzing, wherein the plurality of flags respectively correspond to different failure events associated with one or more chassis components and/or one or more nodes. The flags are sent from the chassis management module 130 to the host device OS 121 via the communications channel(s) established by the communications module 123.

When compared with conventional techniques, the failure prediction layer 141 performs a deeper health analysis with more accurate hardware sensor data to accurately predict hardware failures. In addition, the flag generation layer 142 analyzes the host device OS 121 and node and resource usage to derive appropriate flags as described in more detail below. The flags are sent from the chassis management module 130 over one or more established communication channels to the host device OS 121. The host device OS 121 reads the received flags and performs appropriate actions based on the issues and/or instructions in the flag.

For example, a critical failure flag may be generated by the flag generation layer 142 in response to identified hardware failures, application failures and/or OS crashes. The critical failure flag instructs the host device OS 121 and any corresponding application cluster to stop any loads, traffic or other inputs into an identified failure node (e.g., failed host device, server, VM, container, etc.) and immediately migrate the load, traffic or other inputs to an identified healthy node (e.g., healthy host device, server, VM, container, etc.). In this scenario, an OS cluster may freeze operations on the host device 110 and provide appropriate alerts and notifications to users via the user device(s) 102.

A future predictive failure flag identifies a predicted future failure on the host device 110 or other node and instructs the host device OS 121 and any corresponding application cluster to reduce the loads, traffic or other inputs into the identified failure node and migrate the loads, traffic or other inputs into a healthy host device or other healthy node. In this case, minimal loads, traffic or other inputs will be permitted to be sent to an identified future failure node, and the node will be continuously monitored for further failures. A future predictive failure flag may be generated by the flag generation layer 142 in response to, for example, throttling of hardware, thermal events and power values exceeding or going below designated thresholds. For example, detected degradation of a power supply unit (PSU) can lead to a predicted future failure by the failure prediction layer 141 and generation of a future predictive failure flag by the flag generation layer 142.

A resources utilization alert flag identifies resource shortages on nodes due to, for example, CPU utilization, memory utilization, disk utilization, network utilization, storage utilization, and input/output utilization exceeding designated thresholds. The resources utilization alert flag provides a host device OS 121 with an indication of high resource usage (e.g., utilization values exceeding designated thresholds) and/or low resource usage (e.g., utilization values below designated thresholds). Different mechanisms (e.g., SmartNIC, remote direct memory access (RDMA), etc.) can be used by the host device OS 121 to reduce and/or offload host resource usage to ensure resource usage optimization.

As can be understood, the critical failure flag identifies at least one node as a failure node into which inputs should cease, and at least one other node as a healthy node to which the inputs for the failure node should be diverted. The future predictive failure flag identifies at least one node as a future failure node into which inputs should be reduced, and at least one other node as a healthy node to which the inputs for the future failure node should be diverted. The resources utilization alert flag identifies at least one node as having utilization of at least one resource exceeding a designated threshold. The embodiments are not necessarily limited to the above-described flags, and other flags corresponding to different failure events and/or scenarios of different degrees/urgency can be used.

The failure prediction layer 141 and flag generation layer 142 apply rules to the operational data and data corresponding to node usage to identify the flags to activate. For example, the rules that are applied may include rules as set forth in the following table.

| | Scenario | Action |
|---|---|---|
| Flag 1 | Critical failure<br>Hardware catastrophic<br>failures<br>Application failure<br>OS crash event | Instruct an OS/application<br>cluster to stop any<br>load/traffic into a failure node<br>and immediately migrate the<br>load to a healthy node |
| Flag 2 | Future Predictive Failure<br>Throttling of hardware<br>Thermal events<br>Degraded PSU - PSU<br>failure with redundancy<br>enabled | Indicate a future failure on a<br>host and instruct an<br>OS/application to slowly<br>reduce the load and migrate<br>the load to other hosts |
| Flag 3 | Resources utilization alert<br>Resource shortage due to<br>high utilization - CPU,<br>Memory, HDD, Network,<br>Storage, I/O | Provide an indication of<br>over/under resource<br>utilization by a host |

According to one or more embodiments, the memory 125 and other data repositories or databases referred to herein can be configured according to a relational database management system (RDBMS) (e.g., PostgreSQL). In some embodiments, the memory 125 and other data repositories or databases referred to herein are implemented using one or more storage systems or devices associated with the platform for implementing failure prediction and load balancing for chassis components. In some embodiments, one or more of the storage systems utilized to implement databases, memories and other data repositories referred to herein comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

The platform for implementing failure prediction and load balancing for chassis components comprising the communications module 123, the data collection and processing module 124, and the failure prediction and load balancing engine 140 including the failure prediction layer 141 and the flag generation layer 142 is assumed to be implemented using at least one processing device. Each such processing device generally comprises at least one processor and an associated memory, and implements one or more functional modules for controlling certain features of the platform for implementing failure prediction and load balancing for chassis components.

At least portions of the platform for implementing failure prediction and load balancing for chassis components comprising the communications module 123, the data collection and processing module 124, and the failure prediction and load balancing engine 140 including the failure prediction layer 141 and the flag generation layer 142 and the elements thereof may be implemented at least in part in the form of software that is stored in memory and executed by a processor. The platform for implementing failure prediction and load balancing for chassis components and the elements thereof comprise further hardware and software required for running the platform for implementing failure prediction and load balancing for chassis components, including, GPU hardware, virtualization infrastructure software and hardware, Docker containers, networking software and hardware, and cloud infrastructure software and hardware.

It is assumed that the platform for implementing failure prediction and load balancing for chassis components and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the platform for implementing failure prediction and load balancing for chassis components comprising the communications module 123, the data collection and processing module 124, and the failure prediction and load balancing engine 140 including the failure prediction layer 141 and the flag generation layer 142, and the elements thereof can be implemented in the form of one or more LXCs running on one or more VMs. Other arrangements of one or more processing devices of a processing platform can be used to implement the platform for implementing failure prediction and load balancing for chassis components. Other portions of the system 100 can similarly be implemented using one or more processing devices of at least one processing platform.

It is to be appreciated that these and other features of illustrative embodiments are presented by way of example only, and should not be construed as limiting in any way. Accordingly, different numbers, types and arrangements of system elements such as the communications module 123, the data collection and processing module 124, and the failure prediction and load balancing engine 140 including the failure prediction layer 141 and the flag generation layer 142 and other elements of the platform for implementing failure prediction and load balancing for chassis components, and the portions thereof can be used in other embodiments.

It should be understood that the particular sets of modules and other elements implemented in the system 100 as illustrated in FIG. 1 are presented by way of example only. In other embodiments, only subsets of these elements, or additional or alternative sets of elements, may be used, and such elements may exhibit alternative functionality and configurations.

For example, as indicated previously, in some illustrative embodiments, functionality for the platform for implementing failure prediction and load balancing for chassis components can be offered to cloud infrastructure customers or other users as part of FaaS, CaaS and/or PaaS offerings.

The operation of the information processing system 100 will now be described in further detail with reference to the flow diagram of FIG. 10. With reference to FIG. 10, a process 1000 for implementing failure prediction and load balancing for chassis components as shown includes steps 1002 through 1008, and is suitable for use in the information processing system 100 but is more generally applicable to other types of information processing systems or architectures comprising a platform for implementing failure prediction and load balancing for chassis components.

In step 1002, a communications channel is established between a host device operating system and a chassis management module of a chassis. The communications channel may be further established between the host device operating system, the chassis management module and a baseboard management controller, wherein the baseboard management controller comprises a remote access controller. The communications channel may comprise at least one of a software plug-in, a passthrough channel, a universal serial bus network interface controller and a virtual local area network.

In step 1004, the chassis management module analyzes operational data corresponding to one or more chassis components and data corresponding to usage of one or more nodes by the host device operating system. The operational data may comprise at least one of sensor data, status data and error data corresponding to the one or more chassis components. The one or more chassis components may comprise one or more hardware components.

In step 1006, one or more of a plurality of flags are activated based at least in part on the analyzing, wherein the plurality of flags respectively correspond to different failure events associated with at least one of the one or more chassis components and the one or more nodes. The analyzing may comprise applying one or more rules to the operational data and the data corresponding to usage of the one or more nodes to identify the one or more of the plurality of flags to activate.

In step 1008, the one or more flags are sent from the chassis management module to the host device operating system via the communications channel. At least one flag of the plurality of flags may identify at least one node of the one or more nodes as a failure node into which inputs should cease, and at least one other node of the one or more nodes as a healthy node to which the inputs for the failure node should be diverted. At least one flag of the plurality of flags may identify at least one node of the one or more nodes as a future failure node into which inputs should be reduced, and at least one other node of the one or more nodes as a healthy node to which the inputs for the future failure node should be diverted. At least one flag of the plurality of flags may identify at least one node of the one or more nodes as having utilization of at least one resource exceeding a designated threshold. The at least one resource may comprise at least one of a CPU, a memory, a disk, a network and storage.

The process may further include collecting, via the communications channel, the operational data and the data corresponding to usage of the one or more nodes, and storing the operational data and the data corresponding to the usage of the one or more nodes in a non-volatile memory of the chassis. The operational data and the data corresponding to the usage of the one or more nodes may be processed to remove duplicate data and compress data.

It is to be appreciated that the FIG. 10 process and other features and functionality described above can be adapted for use with other types of information systems configured to implement failure prediction and load balancing for chassis components or other type of platform.

The particular processing operations and other system functionality described in conjunction with the flow diagram of FIG. 10 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 10 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with a platform for implementing failure prediction and load balancing for chassis components as disclosed herein can provide a number of significant advantages relative to conventional arrangements. For example, the embodiments provide a technical solution including a framework that uses a chassis management module to predict failure of chassis components and alert a host device OS of failures and potential failures using flags. Unlike conventional approaches, the embodiments provide for end-to-end communication between a chassis management module, a BMC and a host device OS to enable complete analysis of all system resources and chassis components when identifying failure scenarios. As a result, the illustrative embodiments provide improved accuracy of hardware failure prediction over current techniques, which rely on a host device OS to make failure predictions with incomplete/partial data from a limited subset of hardware and other chassis components.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system elements such as the platform for implementing failure prediction and load balancing for chassis components or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and a common time configuration platform in illustrative embodiments. These and other cloud-based systems in illustrative embodiments can include object stores.

Illustrative embodiments of processing platforms will now be described in greater detail with reference to FIGS. 11 and 12. Although described in the context of information processing system 100, these platforms may also be used to implement at least portions of other information processing systems in other embodiments.

Figure 11:
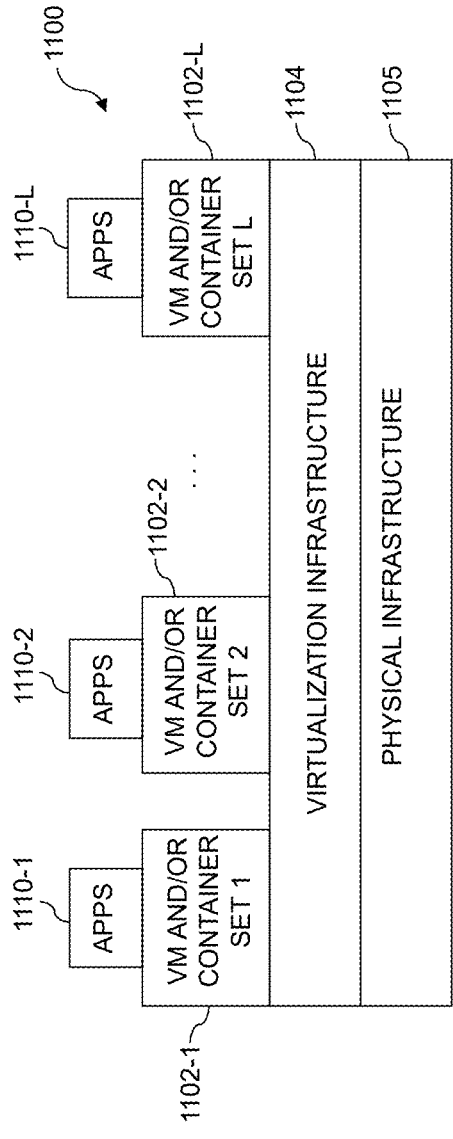
FIGS. 11 and 12 show examples of processing platforms that may be utilized to implement at least a portion of an information processing system according to illustrative embodiments.
Figure 12:
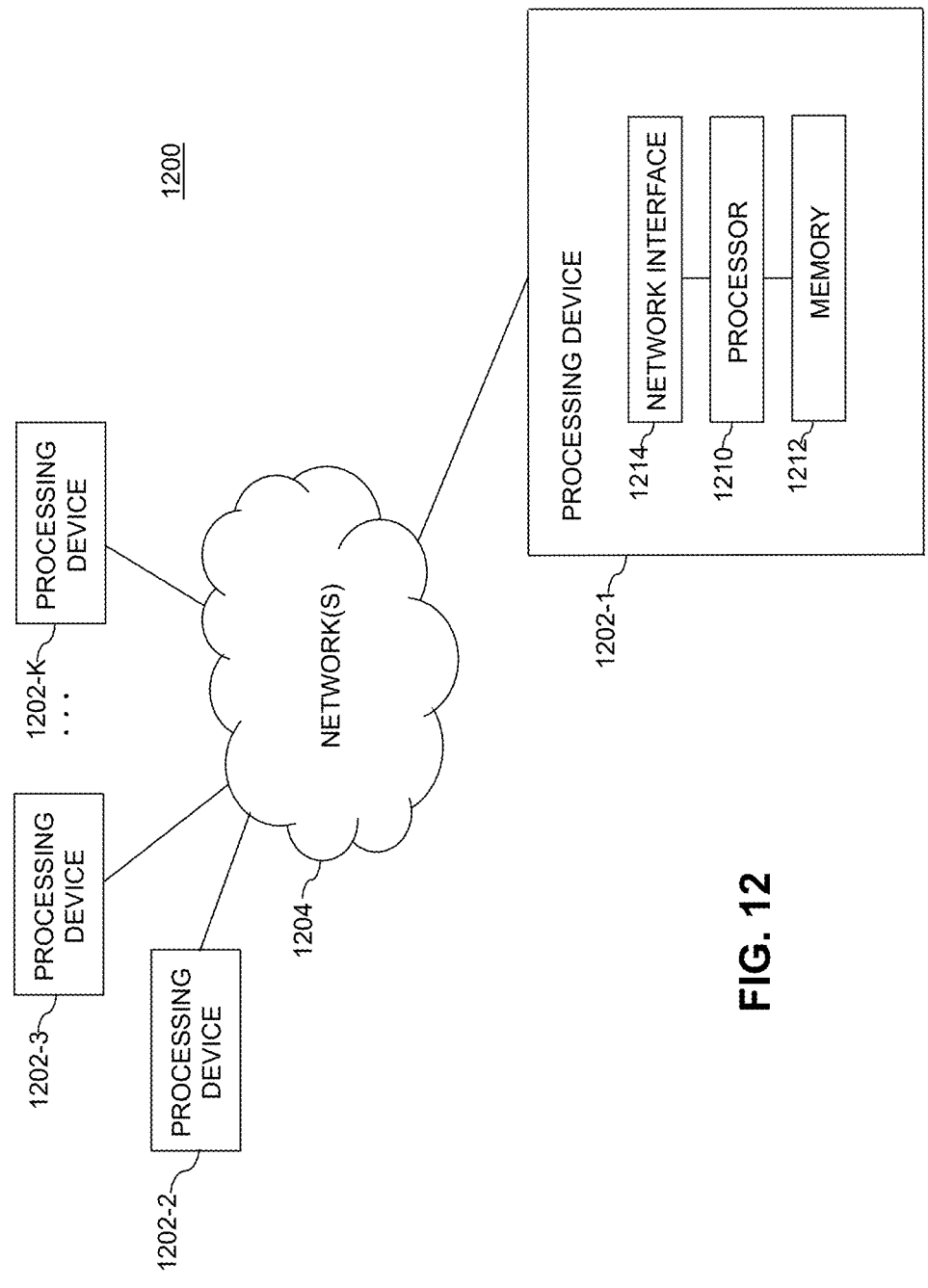

FIG. 11 shows an example processing platform comprising cloud infrastructure 1100. The cloud infrastructure 1100 comprises a combination of physical and virtual processing resources that may be utilized to implement at least a portion of the information processing system 100. The cloud infrastructure 1100 comprises multiple virtual machines (VMs) and/or container sets 1102-1, 1102-2, . . . 1102-L implemented using virtualization infrastructure 1104. The virtualization infrastructure 1104 runs on physical infrastructure 1105, and illustratively comprises one or more hypervisors and/or operating system level virtualization infrastructure. The operating system level virtualization infrastructure illustratively comprises kernel control groups of a Linux operating system or other type of operating system.

The cloud infrastructure 1100 further comprises sets of applications 1110-1, 1110-2, . . . 1110-L running on respective ones of the VMs/container sets 1102-1, 1102-2, . . . 1102-L under the control of the virtualization infrastructure 1104. The VMs/container sets 1102 may comprise respective VMs, respective sets of one or more containers, or respective sets of one or more containers running in VMs.

In some implementations of the FIG. 11 embodiment, the VMs/container sets 1102 comprise respective VMs implemented using virtualization infrastructure 1104 that comprises at least one hypervisor. A hypervisor platform may be used to implement a hypervisor within the virtualization infrastructure 1104, where the hypervisor platform has an associated virtual infrastructure management system. The underlying physical machines may comprise one or more distributed processing platforms that include one or more storage systems.

In other implementations of the FIG. 11 embodiment, the VMs/container sets 1102 comprise respective containers implemented using virtualization infrastructure 1104 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of information processing system 100 may each run on a computer, server, storage device or other processing platform element. A given such element may be viewed as an example of what is more generally referred to herein as a "processing device." The cloud infrastructure 1100 shown in FIG. 11 may represent at least a portion of one processing platform. Another example of such a processing platform is processing platform 1200 shown in FIG. 12.

The processing platform 1200 in this embodiment comprises a portion of system 100 and includes a plurality of processing devices, denoted 1202-1, 1202-2, 1202-3, . . . 1202-K, which communicate with one another over a network 1204.

The network 1204 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1202-1 in the processing platform 1200 comprises a processor 1210 coupled to a memory 1212. The processor 1210 may comprise a microprocessor, a microcontroller, an application-specific integrated circuit (ASIC), a field-programmable gate array (FPGA), a CPU, a GPU, a TPU, a VPU or other type of processing circuitry, as well as portions or combinations of such circuitry elements.

The memory 1212 may comprise random access memory (RAM), read-only memory (ROM), flash memory or other types of memory, in any combination. The memory 1212 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1202-1 is network interface circuitry 1214, which is used to interface the processing device with the network 1204 and other system components, and may comprise conventional transceivers.

The other processing devices 1202 of the processing platform 1200 are assumed to be configured in a manner similar to that shown for processing device 1202-1 in the figure.

Again, the particular processing platform 1200 shown in the figure is presented by way of example only, and information processing system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more elements of the platform for implementing failure prediction and load balancing for chassis components as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and configuration management platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
establishing a communications channel between a host device operating system, a chassis management module, and a remote access controller, wherein the host device operating system, the chassis management module and the remote access controller reside within a same chassis, wherein the remote access controller comprises a baseboard management controller;
analyzing, by the chassis management module, operational data corresponding to one or more chassis components and data corresponding to usage of one or more nodes by the host device operating system;

activating one or more of a plurality of flags based at least in part on the analyzing, wherein the plurality of flags respectively correspond to different failure events associated with at least one of the one or more chassis components and the one or more nodes; and
sending the one or more flags from the chassis management module to the host device operating system via the communications channel;
wherein the steps of the method are executed by at least one processing device operatively coupled to a memory.

2. The method of claim 1 wherein the communications channel comprises at least one of a software plug-in, a passthrough channel, a universal serial bus network interface controller and a virtual local area network.

3. The method of claim 1 further comprising collecting, via the communications channel, the operational data and the data corresponding to usage of the one or more nodes.

4. The method of claim 3 further comprising storing the operational data and the data corresponding to the usage of the one or more nodes in a non-volatile memory of the chassis.

5. The method of claim 3 further comprising processing the operational data and the data corresponding to the usage of the one or more nodes, wherein the processing comprises at least one of removing duplicate data and compressing data.

6. The method of claim 1 wherein the operational data comprises at least one of sensor data, status data and error data corresponding to the one or more chassis components.

7. The method of claim 6 wherein the one or more chassis components comprise one or more hardware components.

8. The method of claim 1 wherein at least one flag of the plurality of flags identifies at least one node of the one or more nodes as a failure node into which inputs should cease, and at least one other node of the one or more nodes as a healthy node to which the inputs for the failure node should be diverted.

9. The method of claim 1 wherein at least one flag of the plurality of flags identifies at least one node of the one or more nodes as a future failure node into which inputs should be reduced, and at least one other node of the one or more nodes as a healthy node to which the inputs for the future failure node should be diverted.

10. The method of claim 1 wherein at least one flag of the plurality of flags identifies at least one node of the one or more nodes as having utilization of at least one resource exceeding a designated threshold.

11. The method of claim 10 wherein the at least one resource comprises at least one of a central processing unit, a memory, a disk, a network and storage.

12. The method of claim 1 wherein the analyzing comprises applying one or more rules to the operational data and the data corresponding to usage of the one or more nodes to identify the one or more of the plurality of flags to activate.

13. An apparatus comprising:
a processing device operatively coupled to a memory and configured:
to establish a communications channel between a host device operating system, a chassis management module, and a remote access controller, wherein the host device operating system, the chassis management module and the remote access controller reside within a same chassis, wherein the remote access controller comprises a baseboard management controller;
to analyze, by the chassis management module, operational data corresponding to one or more chassis components and data corresponding to usage of one or more nodes by the host device operating system;

to activate one or more of a plurality of flags based at least in part on the analyzing, wherein the plurality of flags respectively correspond to different failure events associated with at least one of the one or more chassis components and the one or more nodes; and to send the one or more flags from the chassis management module to the host device operating system via the communications channel.

14. The apparatus of claim 13 wherein at least one flag of the plurality of flags identifies at least one node of the one or more nodes as a failure node into which inputs should cease, and at least one other node of the one or more nodes as a healthy node to which the inputs for the failure node should be diverted.

15. The apparatus of claim 13 wherein at least one flag of the plurality of flags identifies at least one node of the one or more nodes as a future failure node into which inputs should be reduced, and at least one other node of the one or more nodes as a healthy node to which the inputs for the future failure node should be diverted.

16. An article of manufacture comprising a non-transitory processor-readable storage medium having stored therein program code of one or more software programs, wherein the program code when executed by at least one processing device causes said at least one processing device to perform the steps of:

establishing a communications channel between a host device operating system, a chassis management module, and a remote access controller, wherein the host device operating system, the chassis management module and the remote access controller reside within a same chassis, wherein the remote access controller comprises a baseboard management controller;

analyzing, by the chassis management module, operational data corresponding to one or more chassis components and data corresponding to usage of one or more nodes by the host device operating system;

activating one or more of a plurality of flags based at least in part on the analyzing, wherein the plurality of flags respectively correspond to different failure events associated with at least one of the one or more chassis components and the one or more nodes; and sending the one or more flags from the chassis management module to the host device operating system via the communications channel.

17. The article of manufacture of claim 16 wherein at least one flag of the plurality of flags identifies at least one node of the one or more nodes as a failure node into which inputs should cease, and at least one other node of the one or more nodes as a healthy node to which the inputs for the failure node should be diverted.

18. The article of manufacture of claim 16 wherein at least one flag of the plurality of flags identifies at least one node of the one or more nodes as a future failure node into which inputs should be reduced, and at least one other node of the one or more no des as a healthy node to which the inputs for the future failure node should be diverted.

19. The article of manufacture of claim 16 wherein the operational data comprises at least one of sensor data, status data and error data corresponding to the one or more chassis components.

20. The article of manufacture of claim 19 wherein the one or more chassis components comprise one or more hardware components.

* * * * *